US008503968B2

(12) United States Patent
Singh et al.

(10) Patent No.: US 8,503,968 B2
(45) Date of Patent: Aug. 6, 2013

(54) METHOD AND SYSTEM FOR POWER SAVING IN WIRELESS COMMUNICATIONS

(75) Inventors: Harkirat Singh, Santa Clara, CA (US);
Huai-Rong Shao, Santa Clara, CA (US);
Xiangping Qin, San Jose, CA (US);
Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1279 days.

(21) Appl. No.: 12/014,683

(22) Filed: Jan. 15, 2008

(65) Prior Publication Data

US 2008/0176521 A1 Jul. 24, 2008

Related U.S. Application Data

(60) Provisional application No. 60/881,444, filed on Jan. 19, 2007.

(51) Int. Cl.
*H04B 1/16* (2006.01)
*H04W 4/00* (2009.01)

(52) U.S. Cl.
USPC .................. 455/343.1; 455/434; 455/574

(58) Field of Classification Search
USPC ............... 455/435.1, 522, 574, 434; 370/315, 370/338, 343, 349, 390, 400, 437, 443, 445, 370/447
See application file for complete search history.

(56) References Cited

U.S. PATENT DOCUMENTS

| 5,613,200 | A | 3/1997 | Hamabe |
| 5,819,182 | A | 10/1998 | Gardner et al. |
| 5,963,852 | A | 10/1999 | Schlang et al. |
| 6,330,459 | B1 | 12/2001 | Crichton et al. |
| 6,526,036 | B1 | 2/2003 | Uchida et al. |
| 6,853,629 | B2 | 2/2005 | Alamouti et al. |
| 6,980,839 | B2 * | 12/2005 | daCosta ..................... 455/574 |
| 7,027,409 | B2 | 4/2006 | Cain |
| 7,079,509 | B2 | 7/2006 | Belcea |
| 7,085,572 | B2 | 8/2006 | Ishida |
| 7,099,689 | B2 * | 8/2006 | Bahl et al. ................. 455/552.1 |
| 7,103,344 | B2 * | 9/2006 | Menard ..................... 455/343.2 |
| 7,103,383 | B2 | 9/2006 | Ito |

(Continued)

FOREIGN PATENT DOCUMENTS

| KR | 1020020038823 A | 5/2002 |
| KR | 10-2004-0069516 A | 8/2004 |
| WO | 02/067459 A1 | 8/2002 |

OTHER PUBLICATIONS

International Search Report for International Application No. PCT/KR2008/000326 dated Apr. 28, 2008.

(Continued)

*Primary Examiner* — Blane J Jackson
(74) *Attorney, Agent, or Firm* — Kenneth L. Sherman, Esq.; Michael Zarrabian, Esq.; Sherman & Zarrabian LLP

(57) ABSTRACT

A method and a system for wireless communication is provided which involves maintaining a data communication module in a power saving mode, detecting channel reservation for communication on a wireless data channel during one or more reserved time periods, and upon successful data channel reservation, transitioning the data communication module from the power saving mode to an active mode for data communication on the reserved data channel. Preferably, the data communication module is transitioned back to the power saving mode upon completion of data communication on the data channel.

14 Claims, 11 Drawing Sheets

U.S. PATENT DOCUMENTS

| | | | |
|---|---|---|---|
| 7,120,392 B2 | 10/2006 | Chu et al. | |
| 7,126,927 B2 | 10/2006 | Heijenk | |
| 7,155,264 B2* | 12/2006 | Twitchell, Jr. | 455/574 |
| 7,190,961 B2 | 3/2007 | Burr | |
| 7,209,771 B2* | 4/2007 | Twitchell, Jr. | 455/574 |
| 7,221,667 B2 | 5/2007 | Hori et al. | |
| 7,227,851 B1 | 6/2007 | Gopalakrishnan et al. | |
| 7,272,134 B2 | 9/2007 | Iwama et al. | |
| 7,327,981 B2 | 2/2008 | Hundal | |
| 7,359,733 B2 | 4/2008 | Liang et al. | |
| 7,519,034 B2 | 4/2009 | So et al. | |
| 7,519,399 B2 | 4/2009 | Suzuki | |
| 7,565,149 B2 | 7/2009 | Saffre et al. | |
| 7,565,158 B1 | 7/2009 | Aholainen | |
| 7,570,972 B2 | 8/2009 | Pirzada et al. | |
| 7,613,156 B2 | 11/2009 | Rittle et al. | |
| 7,630,339 B2 | 12/2009 | Laroia et al. | |
| 7,653,163 B2 | 1/2010 | Sadri et al. | |
| 7,688,799 B2 | 3/2010 | Yamamoto | |
| 7,724,656 B2 | 5/2010 | Sågfors et al. | |
| 7,725,555 B2 | 5/2010 | Chokshi et al. | |
| 7,742,788 B2 | 6/2010 | Frank | |
| 7,747,218 B2 | 6/2010 | Sasai et al. | |
| 7,792,066 B2* | 9/2010 | Fujii et al. | 370/311 |
| 7,809,835 B2 | 10/2010 | Reunamaki et al. | |
| 7,822,440 B2 | 10/2010 | Park et al. | |
| 7,826,471 B2 | 11/2010 | Wilson et al. | |
| 7,843,819 B1* | 11/2010 | Benveniste | 370/230 |
| 7,844,298 B2 | 11/2010 | Riley | |
| 7,848,706 B2 | 12/2010 | Vilzmann et al. | |
| 7,865,183 B2 | 1/2011 | Salokannel et al. | |
| 7,949,358 B2 | 5/2011 | Wentink et al. | |
| 7,957,777 B1* | 6/2011 | Vu et al. | 455/574 |
| 8,027,282 B2 | 9/2011 | Boehnke et al. | |
| 8,108,414 B2 | 1/2012 | Stackpole | |
| 8,135,400 B2* | 3/2012 | Shao et al. | 455/434 |
| 2004/0002357 A1 | 1/2004 | Benveniste | |
| 2004/0064309 A1 | 4/2004 | Kosai | |
| 2006/0040671 A1 | 2/2006 | Takarabe | |
| 2006/0045035 A1 | 3/2006 | Liu | |
| 2006/0178127 A1* | 8/2006 | Kawasaki | 455/343.2 |
| 2006/0194564 A1* | 8/2006 | Hokimoto et al. | 455/343.2 |
| 2006/0198353 A1 | 9/2006 | Wason et al. | |
| 2006/0209772 A1 | 9/2006 | Fang et al. | |
| 2006/0251256 A1 | 11/2006 | Asokan et al. | |
| 2006/0268802 A1 | 11/2006 | Faccin | |
| 2007/0211846 A1* | 9/2007 | Zhou et al. | 378/4 |
| 2007/0253391 A1 | 11/2007 | Shao et al. | |
| 2007/0268972 A1 | 11/2007 | Kim | |
| 2008/0002652 A1 | 1/2008 | Gupta et al. | |
| 2008/0005219 A1 | 1/2008 | Nabar et al. | |
| 2008/0031208 A1 | 2/2008 | Abhishek et al. | |
| 2008/0056390 A1 | 3/2008 | Rainbolt et al. | |
| 2008/0119209 A1 | 5/2008 | Upp | |
| 2008/0130617 A1 | 6/2008 | Singh et al. | |
| 2008/0175197 A1 | 7/2008 | Shao et al. | |
| 2008/0175198 A1 | 7/2008 | Singh et al. | |
| 2008/0175199 A1 | 7/2008 | Shao et al. | |
| 2008/0176561 A1 | 7/2008 | Shao et al. | |
| 2008/0177886 A1 | 7/2008 | Singh et al. | |
| 2009/0185489 A1 | 7/2009 | Ruffini et al. | |
| 2010/0111006 A1 | 5/2010 | Zhai et al. | |
| 2011/0002243 A1 | 1/2011 | Sherman et al. | |

OTHER PUBLICATIONS

Notification of Transmittal of the International Search Authority, Written Opinion for International Application No. PCT/KR2008/000317 dated Apr. 29, 2008, 10 pages.

Notification of Transmittal of the International Search Authority, Written Opinion for International Application No. PCT/KR2008/000319 dated May 6, 2008, 10 pages.

Shih, E. et al., "Wake on Wireless: An Event Driven Energy Saving Strategy for Battery Operated Devices," Proceedings of the 8th Annual ACM Conference on Mobile Computing and Networking, Sep. 2002, http://www.sigmobile.org/mobicom/2002/papers/p053-shih.pdf, Atlanta, GA, USA.

ECMA International, "High Rate Ultra Wideband PHY and MAC Standard," Standard ECMA-368, 1st Edition, Dec. 2005, pp. i-312, ECMA International, Geneva, Switzerland.

Hitachi, Ltd. et al., "High-Definition Multimedia Interface Specification Version 1.2," Aug. 22, 2005, pp. i-110 and CEC-i-CEC-84, HDMI Licensing, LLC, United States.

LAN/MAN Standards Committee of the IEEE Computer Society, "IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs), IEEE Std 802.15.3 ™ -2003," Sep. 29, 2003, pp. i-315, IEEE, New York, United States.

Multiband OFDM Alliance (MBOA) Special Interest Group et al., "Distributed Medium Access Control (MAC) for Wireless Networks, Draft 0.99," MBOA Special Interest Group and WiMedia Alliance, Inc., Nov. 1, 2005, pp. i-176, United States.

Notification of Transmittal of the International Search Authority, International Search Report and Written Opinion dated May 6, 2008 for International Application No. PCT/KR2008/000318 filed Jan. 18, 2008, pp. 1-9, Korean Intellectual Property Office, Seo-gu, Daejeon, Republic of Korea.

Notification of Transmittal of the International Search Authority, International Search Report and Written Opinion dated May 6, 2008 for International Application No. PCT/KR2008/000323 filed Jan. 18, 2008, pp. 1-10, Korean Intellectual Property Office, Seo-gu, Daejeon, Republic of Korea.

Notification of Transmittal of the International Search Authority, International Search Report and Written Opinion dated Apr. 29, 2008 for International Application No. PCT/KR2008/000316 filed Jan. 18, 2008, pp. 1-11, Korean Intellectual Property Office, Seo-gu, Daejeon, Republic of Korea.

WirelessHD, LLC., "WirelessHD Specification, Revision 0.2 Draft 1," WirelessHD, LLC, 2006, pp. i-221, WirelessHD, LLC, United States.

WirelessHD, LLC., "WirelessHD Specification, Revision 0.1," WirelessHD, LLC, 2006, pp. i-167, WirelessHD, LLC, United States.

Cidon, I. et al., "Fast Connection Establishment in High Speed Networks," Proceedings of the ACM Symposium on Communication Architectures & Protocols (SIGCOMM '90), 1990, pp. 287-296, ACM, United States.

Crutcher, L.A. et al., "Connection Management for an ATM Network, " IEEE Network, Nov. 1992, pg. 42, vol. 6, No. 6: Abstract, IEEE, United States.

Clark, D.D. et al., "An Analysis of TCP Processing Overhead," IEEE Communications Magazine, Jun. 1989, pp. 23-29, vol. 27, No. 6, IEEE, United States.

Lindgren, P. et al., "Fast Connection Establishment in the DTM Gigabit Network," Proceedings of the IFIP TC6/WG6.4 Fifth International Conference on High Performance Networking V, 1994, pp. 283-294, North-Holland Publishing Company Amsterdam, The Netherlands.

Korean Non-Final Office Action dated Mar. 8, 2010 for Korean Patent Application No. 10-2008-7009721 filed on Apr. 23, 2008, pp. 1-5, Korean Intellectual Property Office, Seo-gu, Daejeon, Republic of Korea.

Korean Final Office Action dated Aug. 31, 2010 for Korean Patent Application No. 10-2008-7009721 filed on Apr. 23, 2008, pp. 1-2, Korean Intellectual Property Office, Seo-gu, Daejeon, Republic of Korea.

Korean Non-Final Office Action dated Sep. 17, 2009 for Korean Patent Application No. 10-2008-7008114 filed on Apr. 3, 2008, pp. 1-3, Korean Intellectual Property Office, Seo-gu, Daejeon, Republic of Korea (Machine-generated English translation attached, pp. 1-2).

Korean Final Office Action dated Nov. 20, 2009 for Korean Patent Application No. 10-2008-7008114 filed on Apr. 3, 2008, pp. 1-2, Korean Intellectual Property Office, Seo-gu, Daejeon, Republic of Korea (Machine-generated English translation attached, p. 1).

Korean Non-Final Office Action dated Mar. 8, 2010 for Korean Patent Application No. 10-2008-7009721, filed on Apr. 23, 2008, pp. 1-5, Korean Intellectual Property Office, Seo-gu, Daejeon, Republic of Korea (Machine-generated English translation attached, pp. 1-4).

U.S. Non-Final Office Action for U.S. Appl. No. 12/014,663 mailed Dec. 21, 2010.
U.S. Final Office Action for U.S. Appl. No. 12/014,663 mailed Jun. 21, 2011.
U.S. Non-Final Office Action for U.S. Appl. No. 12/014,663 mailed Oct. 17, 2011.
U.S. Non-Final Office Action for U.S. Appl. No. 12/014,693 mailed on Jan. 6, 2011.
U.S. Notice of Allowance for U.S. Appl. No. 12/014,693 mailed on Apr. 11, 2011.
U.S. Notice of Allowance for U.S. Appl. No. 12/014,693 mailed on Jul. 22, 2011.
U.S. Notice of Allowance for U.S. Appl. No. 12/014,693 mailed on Nov. 1, 2011.
U.S. Non-final Office Action for U.S. Appl. No. 12/014,709 mailed Dec. 21, 2010.
U.S. Non-final Office Action for U.S. Appl. No. 12/014,709 mailed Jun. 9, 2011.
U.S. Non-final Office Action for U.S. Appl. No. 12/014,709 mailed Feb. 21, 2012.
U.S. Non-Final Office Action for U.S. Appl. No. 12/014,719 mailed Aug. 24, 2010.
U.S. Final Office Action for U.S. Appl. No. 12/014,709 mailed Sep. 17, 2012.
U.S. Final Office Action for U.S. Appl. No. 12/014,663 mailed Apr. 23, 2012.
U.S. Non-Final Office Action for U.S. Appl. No. 12/014,663 mailed Jul. 17, 2012.
U.S. Notice of Allowance for U.S. Appl. No. 12/014,663 mailed Nov. 13, 2012.

* cited by examiner

90

METHOD AND SYSTEM FOR POWER SAVING IN WIRELESS COMMUNICATIONS

RELATED APPLICATION

This application claims priority from U.S. Provisional Patent Application Ser. No. 60/881,444 filed on Jan. 19, 2007, incorporated herein by reference.

FIELD OF THE INVENTION

The present invention relates to wireless communications, and in particular to power usage in wireless communications.

BACKGROUND OF THE INVENTION

With the proliferation of wireless communication protocols, many wireless stations are in use in wireless networks. Such wireless stations can communicate over channels in infrastructure mode, ad-hoc mode or other modes. Increasingly, many wireless stations include one or more transceivers that can consume large quantities of power.

BRIEF SUMMARY OF THE INVENTION

The present invention provides a method and a system for wireless communication, which in one embodiment involves maintaining a data communication module in a power saving mode, detecting channel reservation for communication on a wireless data channel during one or more reserved time periods, and upon successful data channel reservation, transitioning the data communication module from the power saving mode to an active mode for data communication on the reserved data channel. Preferably, the data communication module is transitioned back to the power saving mode upon completion of data communication on the data channel.

In another embodiment, a wireless communication method and system, according to the present invention, involves receiving a command from a receiving station at a transmitting station, for adjusting transmission power emanating from the transmitting station on a first wireless channel, adjusting transmission power from the transmitting station in response, and then determining if the transmission power emanating from the receiving station on a second wireless channel is within a range for effective communication therebetween. If the transmission power emanating from the receiving station is not within said range, then transmitting a request to the receiving station to adjust transmission power emanating from the receiving station to be within said range.

In yet another embodiment, a wireless communication method and system, according to the present invention, involves receiving a request from a transmitting station at a receiving station, to determine if transmission power emanating from the transmitting station needs adjustment. The receiving station then determines if the transmission power emanating from the receiving station on a wireless channel is outside a range for effective communication therebetween, and sends a request to the transmitting station to adjust the transmission power of the transmitting station.

These and other features, aspects and advantages of the present invention will become understood with reference to the following description, appended claims and accompanying figures.

DETAILED DESCRIPTION OF THE INVENTION

Figure 1:
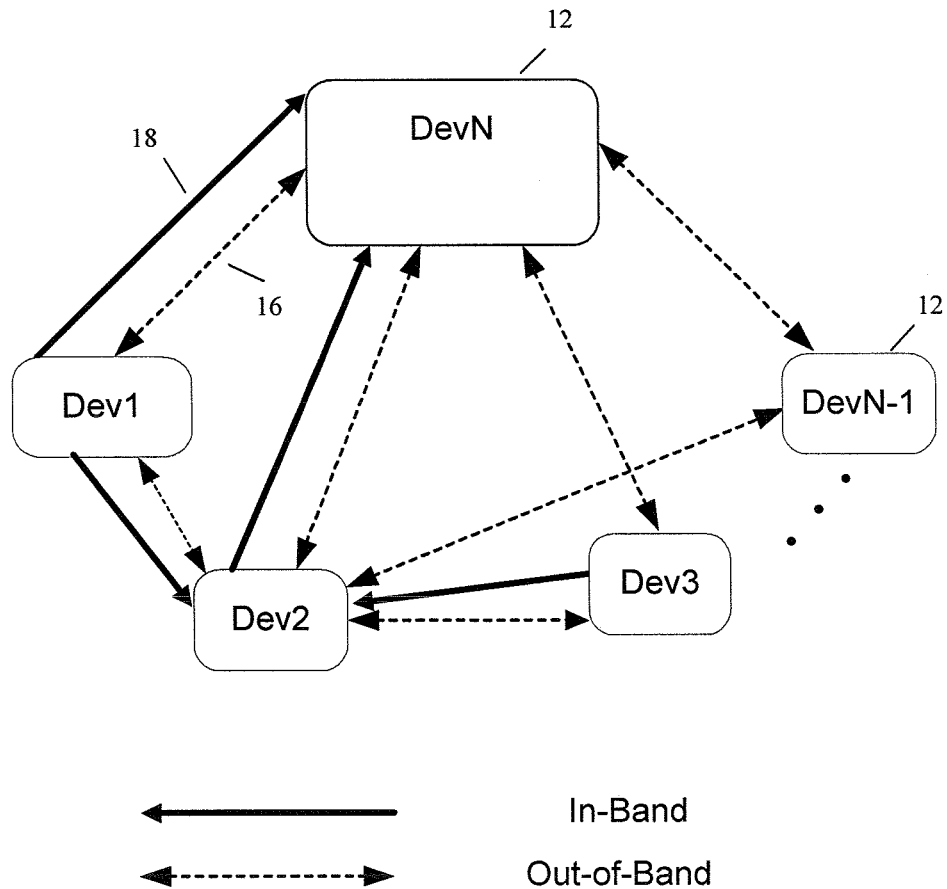
FIG. 1 shows a functional block diagram of a wireless network that implements a wireless communication process, according to an embodiment of the present invention.

The present invention provides a method and a system for power saving in wireless communications. One embodiment involves a power saving scheme in a wireless station having a first transceiver, such as a control channel transceiver, and a second transceiver, such as a data channel transceiver. The control channel transceiver is utilized for communication on a wireless control channel and the data channel transceiver is used for communication on a wireless data channel. The power saving scheme involves using the control channel for communication of control information to facilitate power control for the data channel and the data channel transceiver.

In one implementation, the data channel comprises a wireless in-band channel and the control channel comprises a wireless out-of-band channel. The control channel transceiver comprises a control communication module (out-of-band communication module) configured for communicating control information on the out-of-band channel. The data channel transceiver comprises a data communication module (in-band communication module) configured for data communication on the in-band channel. The power saving scheme involves using the out-of-band channel for communication of control information to facilitate power control for the in-band channel and the in-band transceiver.

Accordingly, in one example scenario the in-band transceiver of a station is normally in a power saving mode (to reduce energy consumption), and the out-of-band transceiver is in an active mode. Upon receiving a control message via the out-of-band transceiver that indicates an in-band channel has been reserved for data communication, the in-band transceiver is transitioned from the power saving mode to an active mode for data communication on the reserved in-band channel. When such data communication is complete, the in-band transceiver can be transitioned back from active mode to power saving mode to conserve power.

An out-of-band channel is a first physical channel that is out-of-band relative to a second physical channel (i.e., an in-band channel). The out-of-band channel is at a frequency different from an in-band channel. For example, an in-band data transmission channel may operate on a 60 GHz frequency band, whereas, an out-of-band channel may operate on a 5 GHz or 2.4 GHz (or even another 60 GHz) frequency band. An out-of-band frequency means a different frequency than an in-band frequency, even if both are in the same frequency band.

The present invention is applicable to high throughput wireless communications, such as ECMA standards on millimeter wave (mm-wave) communication networks, and implementation of WirelessHD standard on uncompressed video transmission. An example implementation for a 60 GHz frequency band wireless network is described below, useful with ECMA and WirelessHD (WiHD) applications. ECMA is an international organization providing ECMA-60 GHz wireless standard. WirelessHD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mm-Wave technology to support a physical (PHY) layer data transmission rate of multi-Gbps (gigabits per second), and can be used for transmitting uncompressed high definition television (HDTV) signals wirelessly. The present invention is useful with other wireless communication systems as well.

FIG. 1 shows a functional block diagram of a wireless network 10 that implements wireless communication between N wireless stations 12 (e.g., devices Dev1, . . . , DevN−1) on a 60 GHz frequency band using Frequency Division Duplex (FDD) channel access, according to an embodiment of the present invention. An out-of-band channel 16 is omni-directional and is used for control message transmissions to coordinate data transmissions on the directional in-band data channel 18 (e.g., 60 GHz). The out-of-band channel 16 can use different technologies such as Bluetooth, WLAN, other wireless technologies such as UWB, or even another different 60 GHz channel (e.g., same bandwidth or narrower than channel 18). The out-of-band channel 16 is a symmetric channel and supports a half-duplex mode. The out-of-band channel 16 has the same coverage range as the in-band data channel 18. The data channel 18 is an asymmetric channel (e.g., 60 GHz data transmission is for one-way transmission only). The channel 16 may be a default channel for control messages for all of the stations, although not all stations support an in-band data channel.

Figure 2:
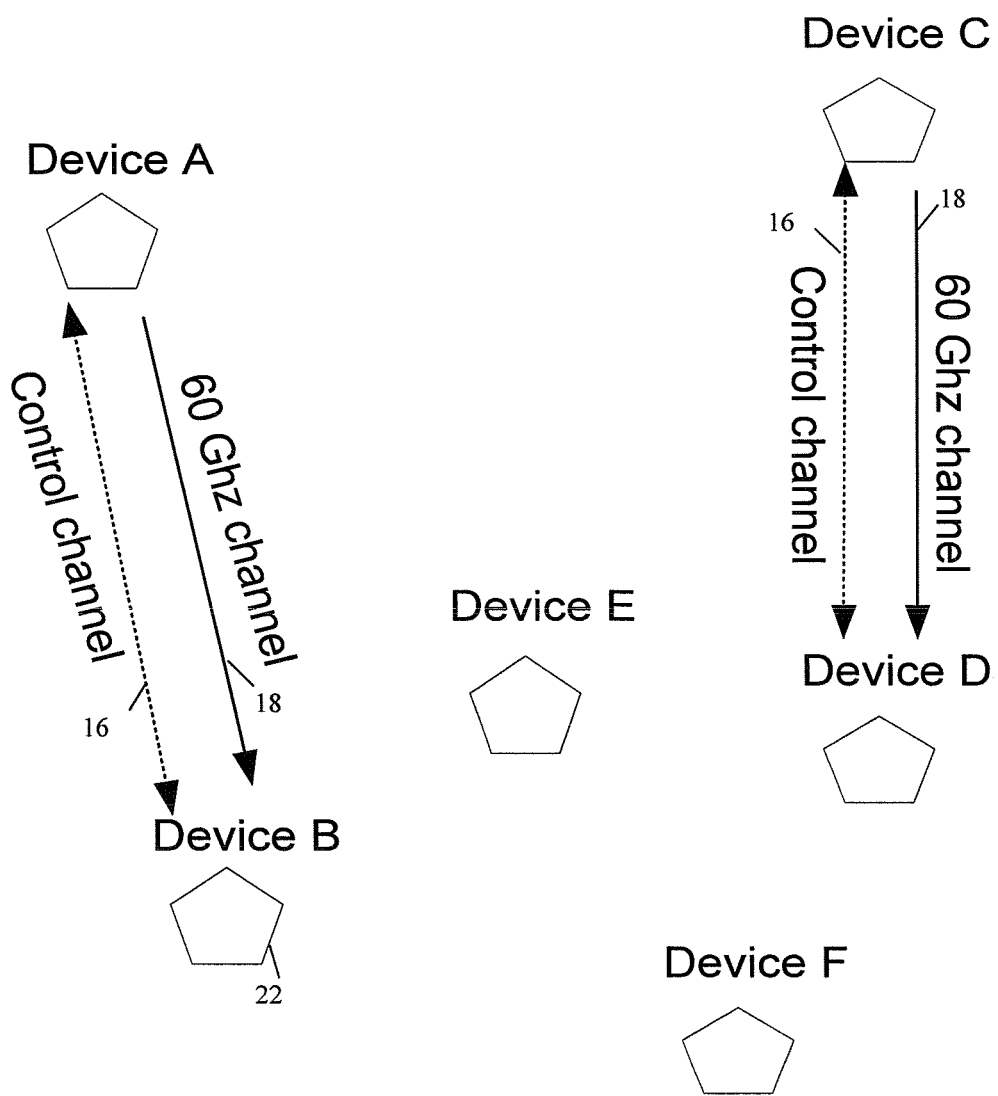
FIG. 2 shows an example communication configuration among multiple wireless stations, according to the present invention.

FIG. 2 shows an example communication configuration in a network 20 including wireless stations 22 (e.g., Device A, Device B, Device C, Device D, Device E and Device F), according to the present invention. The stations 22 use an out-of-band channel (control channel) 16 and an in-band channel (data transmission channel) 18 such as a 60 GHz channel as shown. In this example, Device A and Device B are involved in data communication, and Device C and Device D are involved in data communication. If data transmission from Device A to Device B does not interfere with data transmission from Device C to Device D, then Device A and Device B can simultaneously use the same in-band data channel as Device C and Device D.

Figure 3:
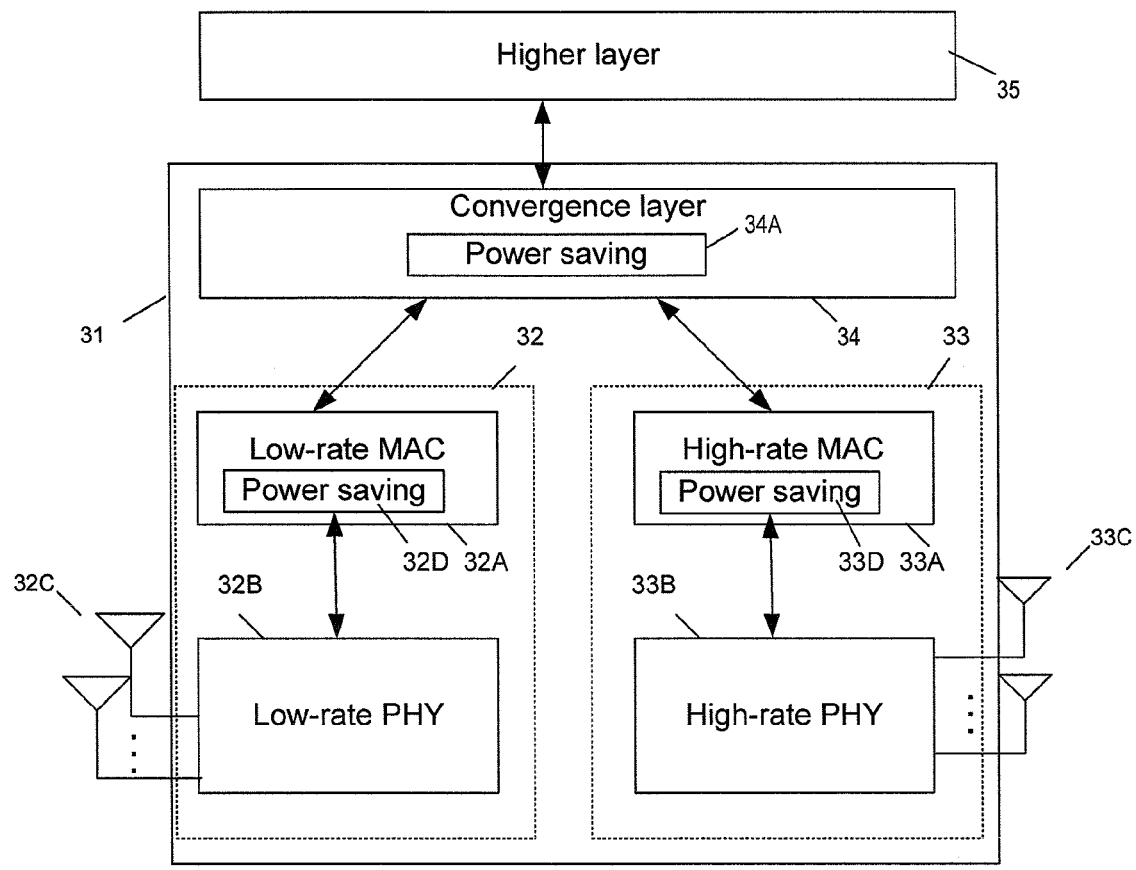
FIG. 3 shows an example block diagram of an architecture for a wireless station, according to the present invention.

FIG. 3 shows an example block diagram of an architecture 30 for a wireless station 31 (e.g., a station 22 in FIG. 2 or a station 12 in FIG. 1). The station 31 includes an out-of-band communication module 32 (e.g., low-rate (LR) wireless transceiver) and an in-band communication module 33 (e.g., high-rate (HR) wireless transceiver). The communication module 32 (control communication module) is used for communication of control messages via an out-of-band channel 16. The communication module 33 (data communication module) is used for data communication via an in-band channel 18.

The station 31 can function as an initiator or a responder, wherein a transmission initiator is a station that first initiates transmission and can be a transmission sender or receiver. A transmission responder is a station that responds to the transmission initiator and can be a transmission sender or receiver. A frame structure is used for data transmission between wireless stations. For example, frame aggregation can be used in a Media Access Control (MAC) layer and a PHY layer. The MAC layer obtains a MAC Service Data Unit (MSDU) and attaches a MAC header thereto, in order to construct a MAC Protocol Data Unit (MPDU), for transmission. The MAC header includes information such as a source address (SA) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

The communication module 33 provides a MAC/PHY path for the data communication over an in-band channel, and the communication module 32 provides a MAC/PHY path for control message communication over an out-of-band channel. Specifically, the communication module 32 implements out-of-band communication for control transmission via an antenna 32C on an LR out-of-band channel 16. The communication module 32 implements an in-band communication for transmission of information (e.g., data, video, audio, etc.) via the antennas 33C on an HR in-band channel 18. Specifically, the communication module 33 comprises a high-rate (HR) module including a HR MAC/PHY path for the in-band data channel 18 (e.g., a 60 GHz frequency band). The communication module 33 provides a HR MAC layer 33A and a HR PHY layer 33B, and supports directional (or beam-formed/steered) wireless communication on the in-band channel 18. The communication module 32 comprises a low-rate module including a LR MAC/PHY path for the out-of-band channel 16 (e.g., Bluetooth, UWB or WLAN, or a different 60 GHz band as used in the HR path). The communication module 32 comprises a LR MAC layer 32A and a LR PHY layer 32B, and supports omni-directional wireless communication over the out-of-band channel 16.

The convergence module 34 interfaces with a higher layer 35, such as an application/user control module, and coordinates messages between the communication modules 32 and 33. The convergence module 34 and the communication modules 32, 33 cooperatively function to implement a power saving scheme according to the present invention, wherein the station 31 can be in two modes (states):

Power saving mode—The station is neither attempting to transmit nor receive on the in-band data channel (e.g., 60 GHz channel). The communication module 33 is in, e.g., sleep/off mode.

Active mode—The station is receiving, transmitting or preparing to transmit or receive on the in-band data channel (i.e., the communication module 33 is not in power saving mode).

Normally, the LR communication modules 32 of plural stations 31 are on for communication on the out-of-band channel 16, while the HR communication module 33 of each station 31 is placed in power saving mode by, e.g., turning the HR PHY 33B and HR antennas 33C off. The HR communication module 33 of a station 31 is placed in active mode after an in-band data channel 18 is successfully reserved, via signaling by the LR communication module 32 on the out-of-band channel 16, for data communication with another wireless station on the in-band data channel 18.

In one example, the HR communication module 33 is transitioned from the power saving mode to the active mode by the convergence module 34 when a control message for such a transition is received via the LR PHY 32B of the LR communication module 32 via the out-of-band channel. The control message is received on the out-of-band channel 16 via the LR communication module 32, indicating that an in-band data channel 18 has been successfully reserved. The control message can also be a beacon that provides a schedule indicating such a reservation. As such, the state of the HR related hardware in a wireless station that is about to communicate data (e.g., send and/or receive data) on the in-band data channel can be changed using a control message sent to the convergence module 34 via the out-of-band channel.

Figure 4:
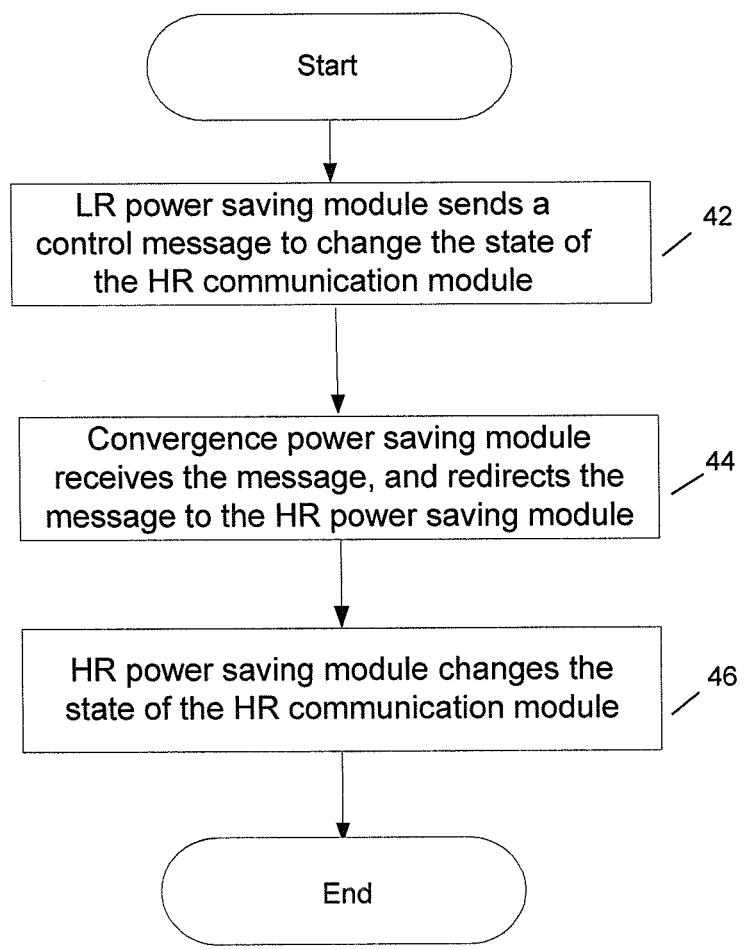
FIG. 4 shows an example power saving process in a wireless communication station, according to the present invention.

Referring back to FIG. 3, the convergence module 34 and the communication modules 32, 33 include power saving modules 32D, 33D and 34A, respectively, which cooperatively function to implement a power saving scheme using an example process 40 in FIG. 4, according to the present invention. The LR power saving module 32D controls the state of the HR communication module 33. Upon receiving a control message on the out-of-band channel (indicating successful data channel reservation) the LR power saving module 32D initiates transitioning the HR communication module 33 from power saving mode to active mode. Accordingly, referring to FIG. 4 in conjunction with FIG. 5, the LR power saving module 32D sends a message ①(FIG. 5) to the power saving module 34A of the convergence module 34 (step 42). The convergence module 34 in turn sends a message ② to the HR power saving module 33D (step 44). Upon receiving the message from the convergence layer 34, the HR power saving module 33D changes the state of the HR communication module 33 from power saving to active mode (step 46). One example application of the process 40 is when a new stream is reserved between two wireless stations, and both the sender and receiver stations change the state of their respective HR communication modules 33 to the active mode for 60 GHz high-rate data transmission and reception. In the example implementation shown in FIG. 5, the station 31 includes the higher layer 35. The higher layer 35 may include middle-ware software, user interfaces and/or applications.

Using the process 40, the LR power saving module 32D can also change the state of the HR communication module 33 from active to power saving mode by sending an appropriate message to the convergence module 34 which in turn sends a message to the HR power saving module 33D to transition the HR communication module 33 from active to power saving mode. One example scenario is when the LR communication module 32 receives a control message or beacons on the out-of-band channel indicating the end of the stream communication (or the end of the data channel reservation period), upon which the LR power saving module 32D transitions the state of the HR communication module 33 from active back to power saving mode.

The HR power saving module 33D responds to power saving mode change messages (commands) received from the LR power saving module 32D via the convergence module 34. The HR power saving module 33D can also initiate the state change from active to power saving mode when the HR MAC 33A (FIG. 3) determines that the HR stream has finished, and no other data transfer requests involving the station 31 are pending.

Figure 6:
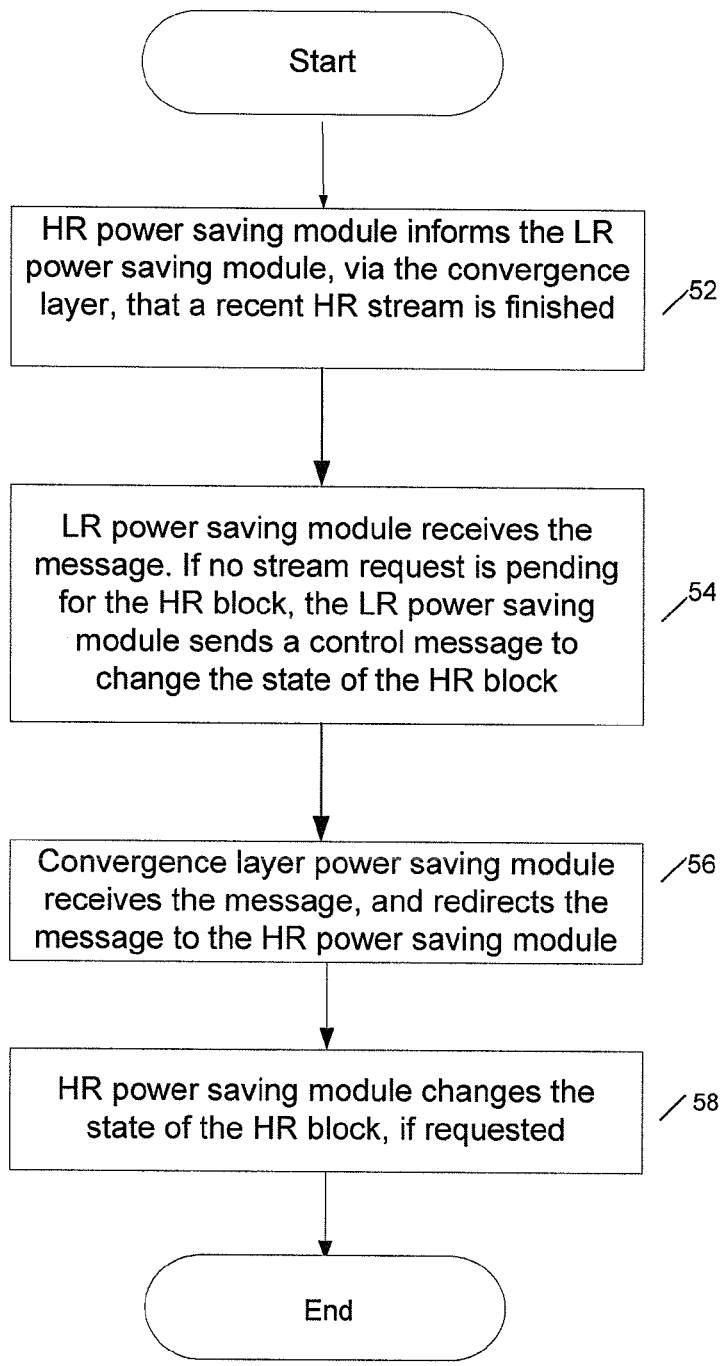
FIG. 6 shows another example power saving process in a wireless communication station, according to the present invention.
Figure 7:
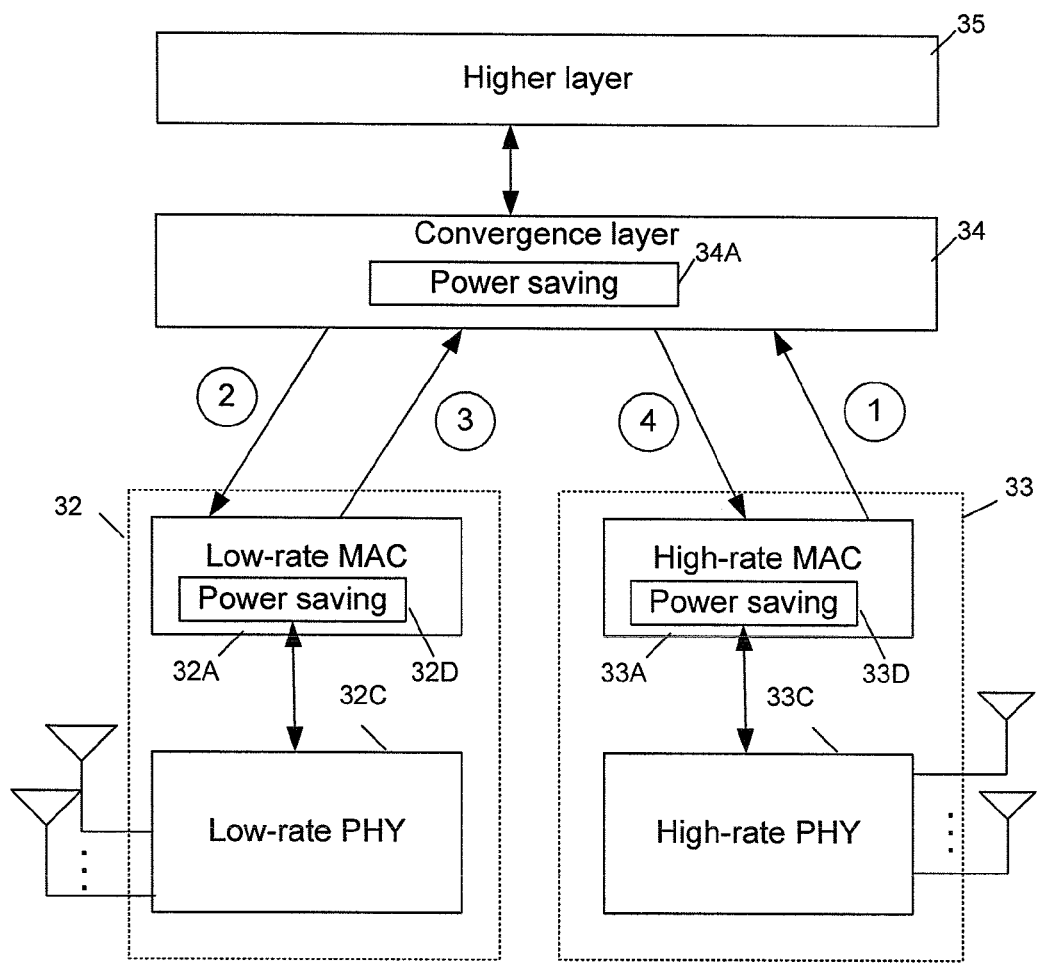
FIG. 7 shows a functional block diagram of another example wireless station implementing a power saving process according to the present invention.

FIG. 6 in conjunction with FIG. 7, shows an example process 50 according to the present invention, wherein the HR power saving module 33D initiates mode/state change from active to power saving mode for the station 31. In step 52, the HR power saving module 33D informs the LR power saving module 32D via the convergence layer 34, that a recent HR stream transmission on the reserved data channel has completed (step 52). Specifically, the HR power saving module 33D (FIG. 7) send a message ① to the power saving module 34A of the convergence module 34 indicating completion of the stream transmission, and the module 34A in turn sends a message ② indicating the same to the LR power saving module 32D. Then, in step 54, the LR power saving module 32D receives the message from the module 34A. The LR power saving module 32D checks beacons/messages on the out-of-band channel to determine that other stream requests are not pending for the communication module 33, and sends message ③ to the module 34A to place the HR communication block 33 to power saving mode. If another stream is pending, steps 56 and 58 are not performed. Then, in step 56, the module 34A receives the message from the LR power saving module 32D and in turn sends an appropriate message ④ to the HR power saving module 33D to transition the HR communication module 33 from active to power saving mode. Finally, in step 58, the HR power saving module 33D changes the state of the HR communication module 33 from active to power saving.

Figure 5:
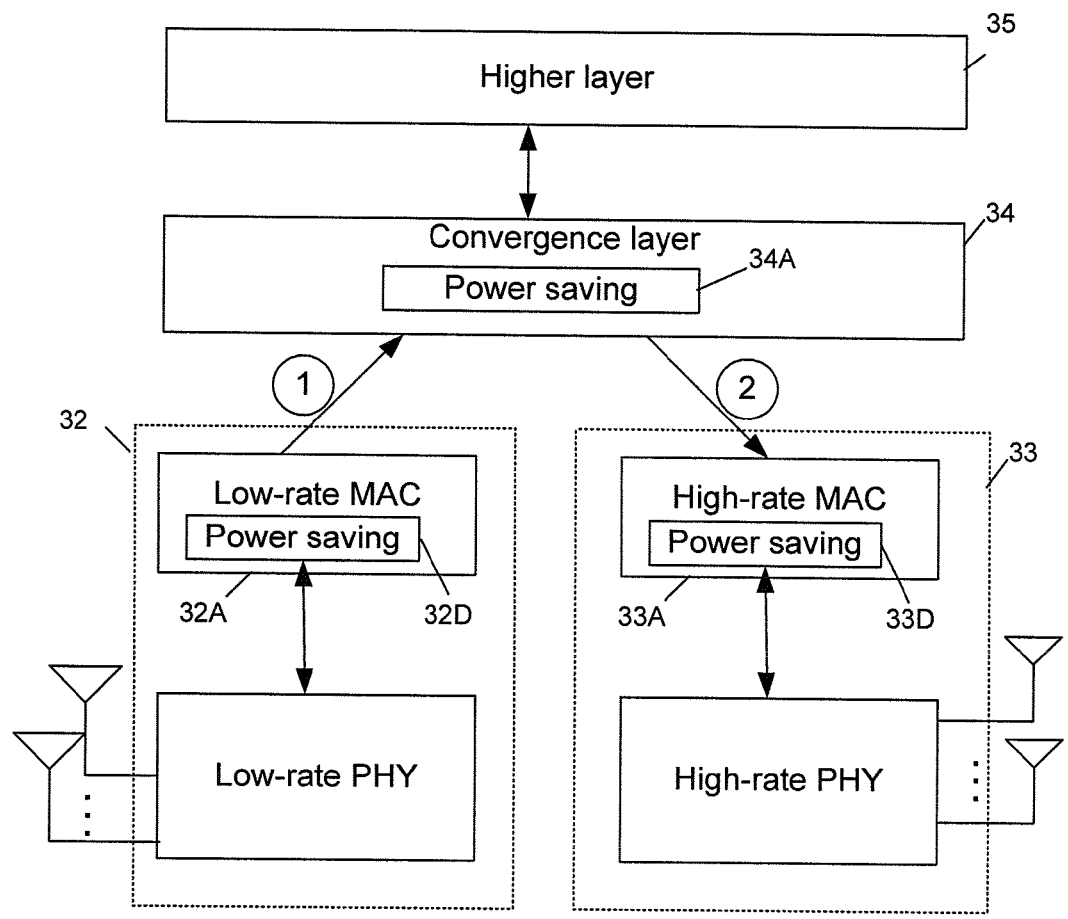
FIG. 5 shows a functional block diagram of an example wireless station implementing a power saving process according to the present invention.

Generally, the role of the power saving module 34A in the convergence module is to appropriately re-direct message, and/or convert the message format, from LR power saving module 32D to HR power saving module 33D, and vice-a-versa. The convergence layer converts and redirects messages from LR to HR and HR to LR. As shown in FIGS. 4 and 5, the convergence layer converts messages from LR to HR. In FIGS. 6 and 7, the convergence layer converts messages from HR to LR.

A channel reservation scheme may be applied to a wireless channel (out-of-band channel and/or in-band channel) based on a superframe structure including superframes separated by beacons. In a contention-free period (CFP), time scheduling is utilized, wherein beacons provide information about scheduled channel time blocks. Reserving a channel includes reserving channel bandwidth for communication during a reserved period. For example, a bandwidth reservation scheme is applied based on the superframe structure, wherein beacons divide the channel time into multiple superframes. In each superframe there are contention periods and CFPs. In each CFP there are one or more schedules, wherein each schedule includes one or more reserved channel time blocks reserved for a requested transmission. The schedules represent reserved channel time block periods, and the time periods between the schedules are unreserved channel time blocks. The length of each reserved channel time block is defined in a schedule for a pair of stations. In one example, a beacon can include bandwidth allocation information elements (IE), indicating channel occupation information (e.g., certain duration of a channel time block is reserved for communication).

In addition to remaining in power saving mode when data transfer on the data channel 18 is not taking place, a pair of stations 31 (e.g., Devices A and B in FIG. 2) may control their transmission power levels to conserve power and to also reduce interference with communication between other stations (e.g., Devices C and D), according to the present invention. In one example, each station 31 uses the LR channel 16 to exchange power control messages for adjusting power levels of transmissions by the LR communication module 32 and/or the HR communication module 33 (FIG. 3).

Figure 8:
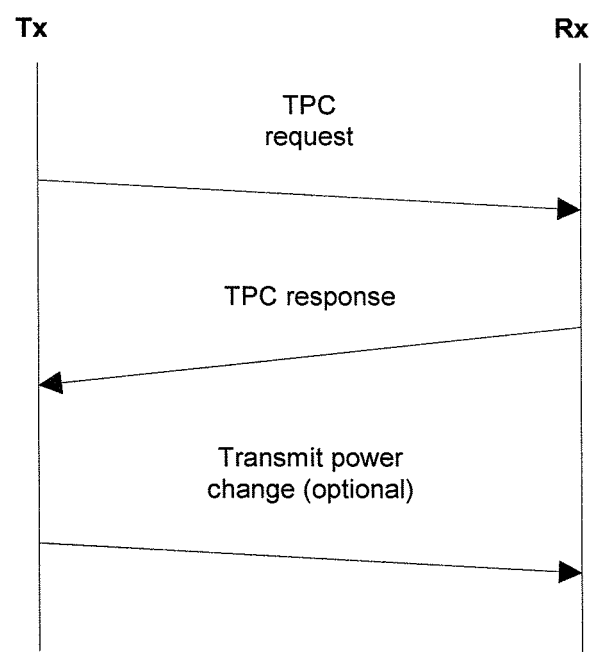
FIG. 8 shows an example process for power adjustment between a pair of wireless stations, according to the present invention.

For example, as shown by example process 60 in FIG. 8, a transmitter station Tx (e.g., Device A) can request a transmission power change report (TPC report, Table 1), from a receiver station Rx (e.g., Device B) using a TPC request command (Table 2).

TABLE 1

TPC report

| Bits: 8 | 8 | 8 | 8 |
|---|---|---|---|
| Element ID | Length | Transmit Power | RSSI |

TABLE 2

TPC request command

| Bits: 8 | 1 | 7 |
|---|---|---|
| Command ID | LR or HR | Length |

The TPC report comprises an IE used to report the transmit power level and the received signal strength. The Transmit Power field provides the transmit power level used to transmit the TPC request command. The RSSI field (Received Signal Strength Indicator) indicates the current received signal strength.

The receiver can be a coordinator station or a peer station. Upon receiving the TPC request, the receiver sends back a TPC report using a TPC response (Table 3).

TABLE 3

TPC response

| Bits: 8 | 7 | 1 | 8 |
|---|---|---|---|
| Command ID | Length | LR or HR | TPC report IE |

The receiver station uses a TPC command (Table 4) to command the transmitter station to decrease its transmit power (on the LR channel and/or the HR channel) when the received signal strength exceeds a threshold (e.g., maximum limit) needed for effective communication.

The receiver station commands the transmitter station to increase its power if the link quality degrades. The transmitter station adjusts its transmit power (from LR communication module 32 and/or HR communication module 33) accordingly, after it receives a TPC command from the receiver station.

TABLE 4

TPC command

| Bits: 8 | 7 | 1 | 16 |
|---|---|---|---|
| Command ID | Length | LR or HR | Transmit Power Change |

The Transmit Power Change field in the TPC command indicates the power change in dB. For example, a power increase by 2 dB is represented by 0x02 and a power decrease by 2 dB is represented by 0xFD.

Figure 9:
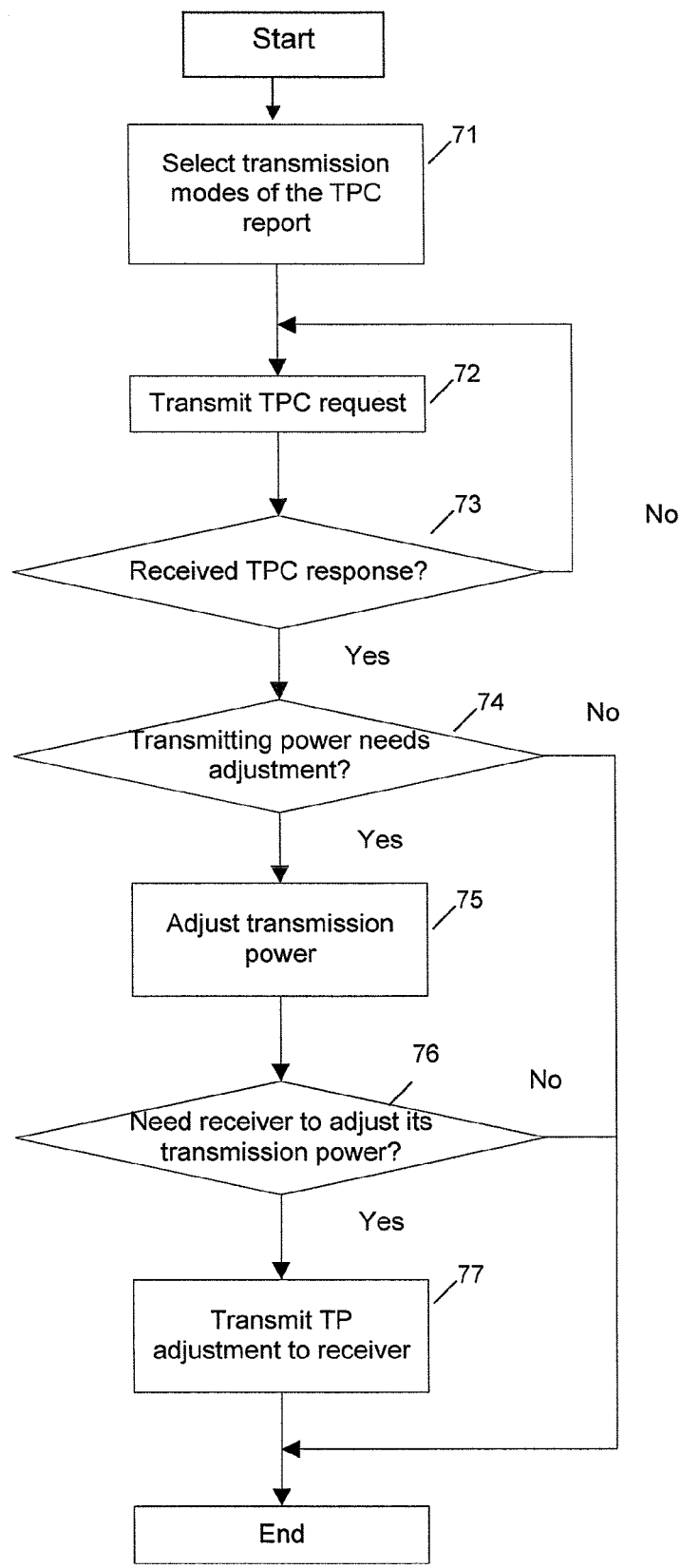
FIG. 9 shows an example power adjustment process for power saving at a wireless transmitting station, according to the present invention.
Figure 10:
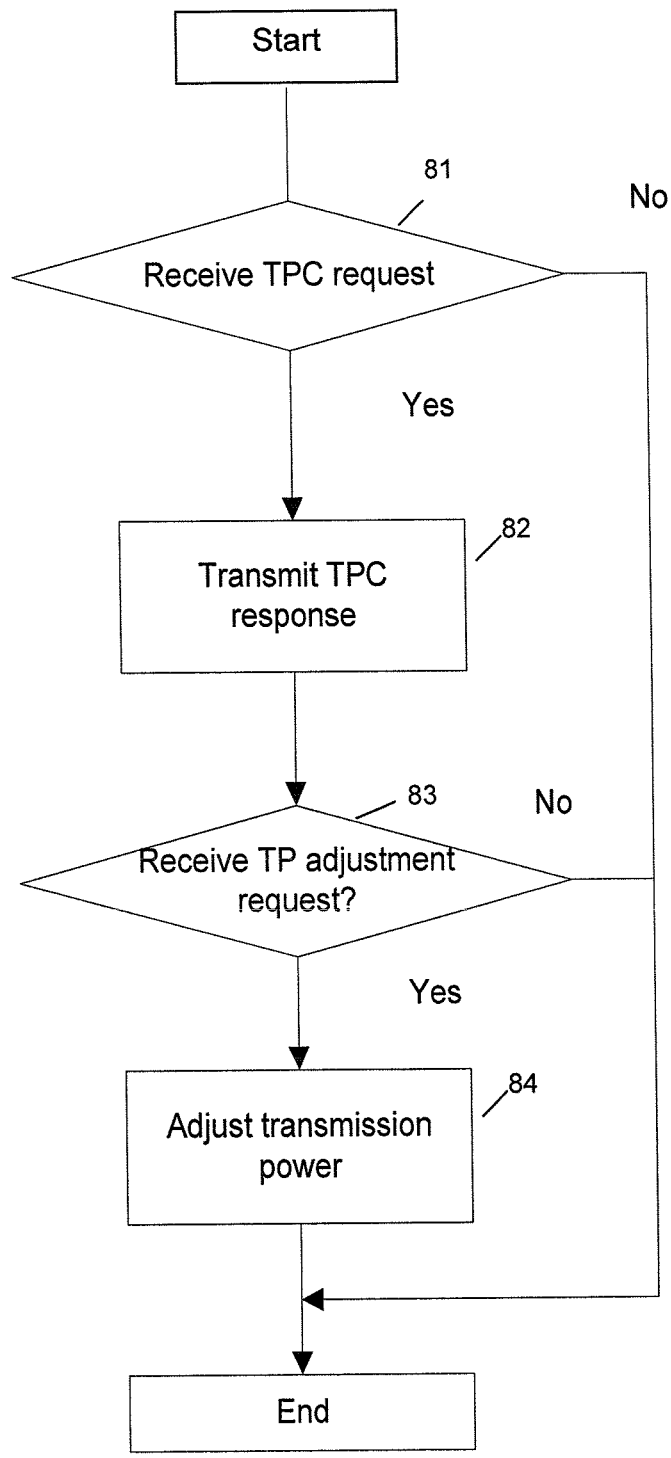
FIG. 10 shows an example power adjustment process for power saving at a wireless receiving station, according to the present invention.

FIG. 9 shows a process 70 for a TPC operation by a transmitter station (e.g., a station 31 in FIG. 3), and FIG. 10 shows a process 80 for a TPC operation by a receiver station (e.g., a station 31), according to the present invention. In one example, the steps of processes 70 and 80 are implemented by the power saving modules 32D and 33D in each station 31 (FIG. 3).

Referring to FIG. 9, the TPC process 70 implemented by a transmitter station Tx (e.g., Device A in FIG. 2) includes the following steps:

Step 71: Select transmission modes of the TPC report.

Step 72: Transmit TPC request to a receiver station Rx (e.g., Device B in FIG. 2).

Step 73: Determine if a TPC response is received from the receiver station? If yes, the process proceeds to step 74, otherwise the process proceeds back to step 72.

Step 74: Based on the TPC response, determine if the transmission power of Tx needs adjustment? If yes, the process proceeds to step 75. Else stop.

Step 75: Adjust the transmission power of Tx (from LR communication module 32 and/or HR communication module 33) based on the information in the TPC response.

Step 76: Determine if the receiver station should adjust its transmission power? This can be achieved by, e.g., detecting signal strength from the receiver station, and determining if the signal strength is outside a range for effective communication (e.g., the received signal strength is below a minimum threshold, or over a maximum threshold, for effective communication). If yes, the process proceeds to step 77. Else stop.

Step 77: Transmit Transmission Power (TP) adjustment to the receiver station, with the amount of transmission power adjustment desired of the receiver station. Stop.

Transmission modes of the TPC report correspond to different transmission power levels and different transmission rates. The transmitter may have some targeted transmission rate it needs to achieve and corresponding transmit power level is estimated and selected too.

TPC adjustment is transmitted in the format of Table 4. The transmit power control is used to adjust the transmit power so that robust transmission is achieved with minimal power.

Referring to FIG. 10, the TPC process 80 implemented by the receiver station Rx includes the following steps:

Step 81: Determine if a TPC request is received from the transmitting station? If yes, the process proceeds to step 82. Else stop.

Step 82: Transmit a TPC response to the transmitting station to require an adjustment. An adjustment is required when the received signal strength from the transmitting station is outside a range for effective communication (e.g., the received signal strength is below a minimum threshold, or over a maximum threshold, for effective communication).

Step 83: Determine if a TP adjustment request is received from the transmitting station? If yes, the process proceeds to step 84. Else stop.

Step 84: Adjust the transmission power (from LR communication module 32 and/or the HR communication module 33) at the receiver station. Stop.

As such, the transmitter and receiver stations adjust their transmission power to levels that conserve power while still allowing effective communication therebetween.

Wireless transmission on the LR control channel typically has greater range than wireless transmission on the HR data channel. According to the present invention, using the processes 70 and 80 described above, the power level for the transmission on the LR control channel can be adjusted based on the type of transmission to conserve power. For example, given a pair of wireless stations 31 that are in communication with each other on a HR data channel, control message transmissions on the LR control channel to support the communication on the HR data channel can be transmitted at a lower power level since control message transmissions need only be heard by that pair of stations. This provides additional power saving.

Figure 11:
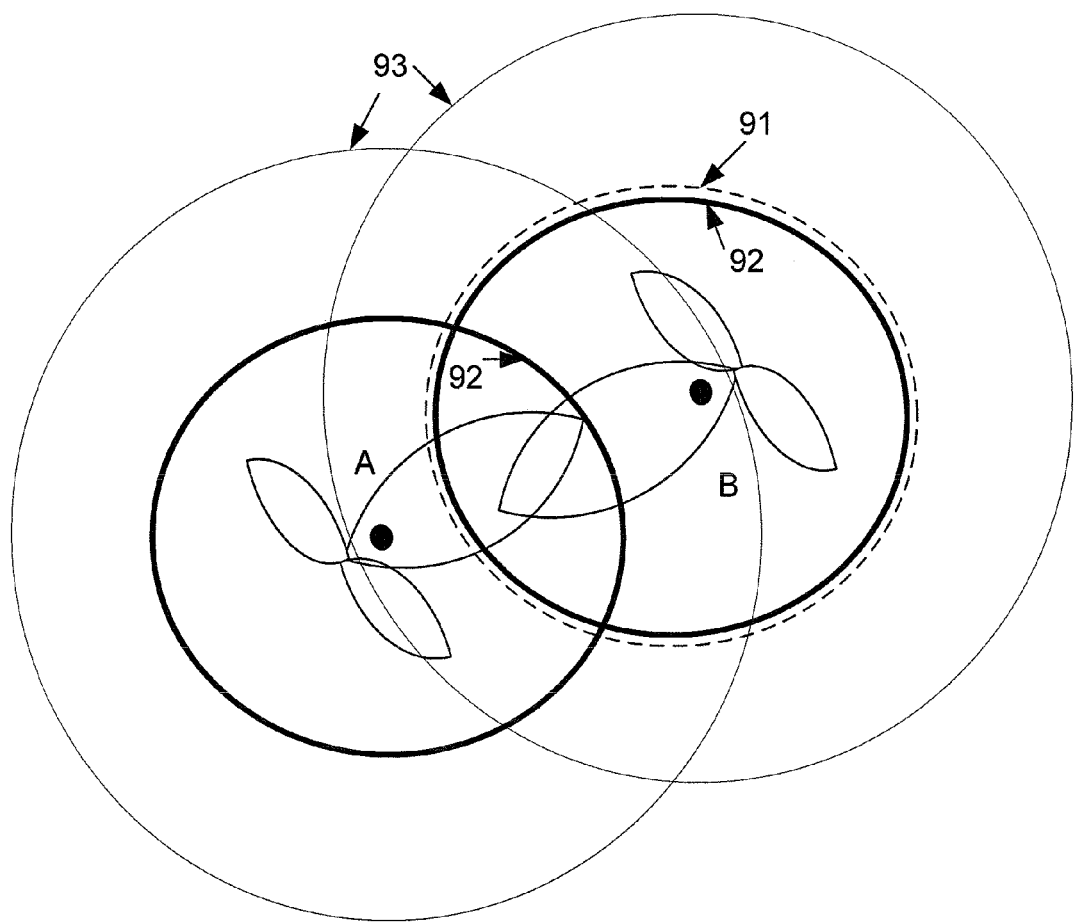
FIG. 11 shows an example application of power adjustment for power saving between a pair of wireless stations, according to the present invention.

Referring to the example wireless communication scenario 90 in FIG. 11 between a pair wireless stations, Device A and Device B, the LR power saving module 32D of a station 31 (FIG. 3) is further configured to conserve power by transmitting omni-directional control message transmissions (e.g., ACK, beamtrack or other control/management messages) that are related to HR data channel transmissions (e.g., 60 GHz transmission) between Device A and Device B, at a reduced power that covers a range 91 essentially matching the range 92 of the HR channel transmissions between Device A and Device B. Channel reservation control messages on the LR control channel that must also be heard by other stations are still transmitted on the LR channel at a power level for maximum LR channel range 93 to be heard by as many stations as possible to avoid interference.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication, comprising:
   maintaining a data communication module in a power saving mode; and
   detecting channel reservation for communication on a wireless data channel during one or more reserved time periods based on control information received over a wireless control channel through a convergence layer, for transitioning the data communication module from the power saving mode to an active mode.

2. The method of claim 1 further including transitioning the data communication module back to the power saving mode upon completion of data communication on the data channel.

3. The method of claim 2, wherein:
   receiving control information over the wireless control channel further includes maintaining a control communication module in an active mode for communication on the control channel; and
   the data channel comprises an in-band channel and the control channel comprises an out-of-and channel, such that the in-band channel and the out-of band channel are at different wireless frequencies.

4. The method of claim 2, further comprising:
   redirecting and converting messages from the control channel to the data channel, and from the data channel to the control channel via the convergence layer.

5. The method of claim 1, further comprising upon successful data channel reservation, transitioning the data communication module from the power saving mode to the active mode for data communication on the reserved data channel during the one or more reserved time periods.

6. The method of claim 3 further including performing directional data communication on the in-band data channel, wherein the in-band channel comprises a 60 GHz wireless channel.

7. A wireless communication system, comprising:
   a data communication module configured for communication on a data channel;
   a power saving module configured for maintaining the data communication module in a power saving mode until detection of channel reservation for communication on a wireless data channel during one or more reserved time periods, and then transitioning the data communication module from the power saving mode to an active mode for data communication on the reserved data channel during the one or more reserved time periods; and
   a convergence module for providing received control information, indicative of a channel reservation for communication on a wireless data channel, to the power saving module for transitioning the data communication module from the power saving mode to the active mode.

8. The wireless communication system of claim 7, wherein:
   the control information to the data communication module is provided through a convergence layer, for transitioning the data communication module from the active state to the power saving state for communication on the data channel; and
   the power saving module is further configured for transitioning the data communication module back to the power saving mode upon completion of data communication on the data channel.

9. The wireless communication system of claim 7 further comprising a control communication module configured for receiving control information communications over a wireless control channel, and detecting data channel reservation based on the received control information.

10. The wireless communication system of claim 9, wherein the control communication module is further configured to remain in an active mode for communication on the control channel, and the data channel comprises an in-band channel and the control channel comprises an out-of-band channel, such that the in-band channel and the out-of-band channel are at different wireless frequencies.

11. The wireless communication system of claim 10 wherein the data communication module is configured for performing directional data communication on the in-band data channel, wherein the in-band channel comprises a 60 GHz wireless channel.

12. The wireless communication system of claim 7, wherein the convergence module redirects and converts messages from the control channel to the data channel, and from the data channel to the control channel via the convergence layer.

13. A wireless communication system, comprising:
   a data communication module that communicates on a data channel;
   a power saving module that maintains the data communication module in a power saving mode until detection of channel reservation for communication on a wireless data channel during one or more reserved time periods; and
   a convergence module that provides received control information, indicative of a channel reservation for communication on a wireless data channel, to the power saving module for transitioning the data communication module from the power saving mode to an active mode.

14. A wireless communication system, comprising:
a data communication module that communicates on a data channel;
a power saving module that maintains the data communication module in a power saving mode based on channel reservation information; and
a convergence module that provides received control information, indicative of a channel reservation for communication on a wireless data channel, to the power saving module for transitioning the data communication module from the power saving mode to an active mode,
wherein the convergence module redirects and converts messages between a control channel and the data channel.

* * * * *